Dec. 4, 1962   H. K. WUCHERER   3,066,922
CARBURETORS

Filed Sept. 5, 1958   4 Sheets-Sheet 1

Inventor:
HEINRICH KLAUS WUCHERER
By Otto John Munz
ATTORNEY

Dec. 4, 1962    H. K. WUCHERER    3,066,922
CARBURETORS

Filed Sept. 5, 1958    4 Sheets-Sheet 3

Inventor:
HEINRICH KLAUS WUCHERER

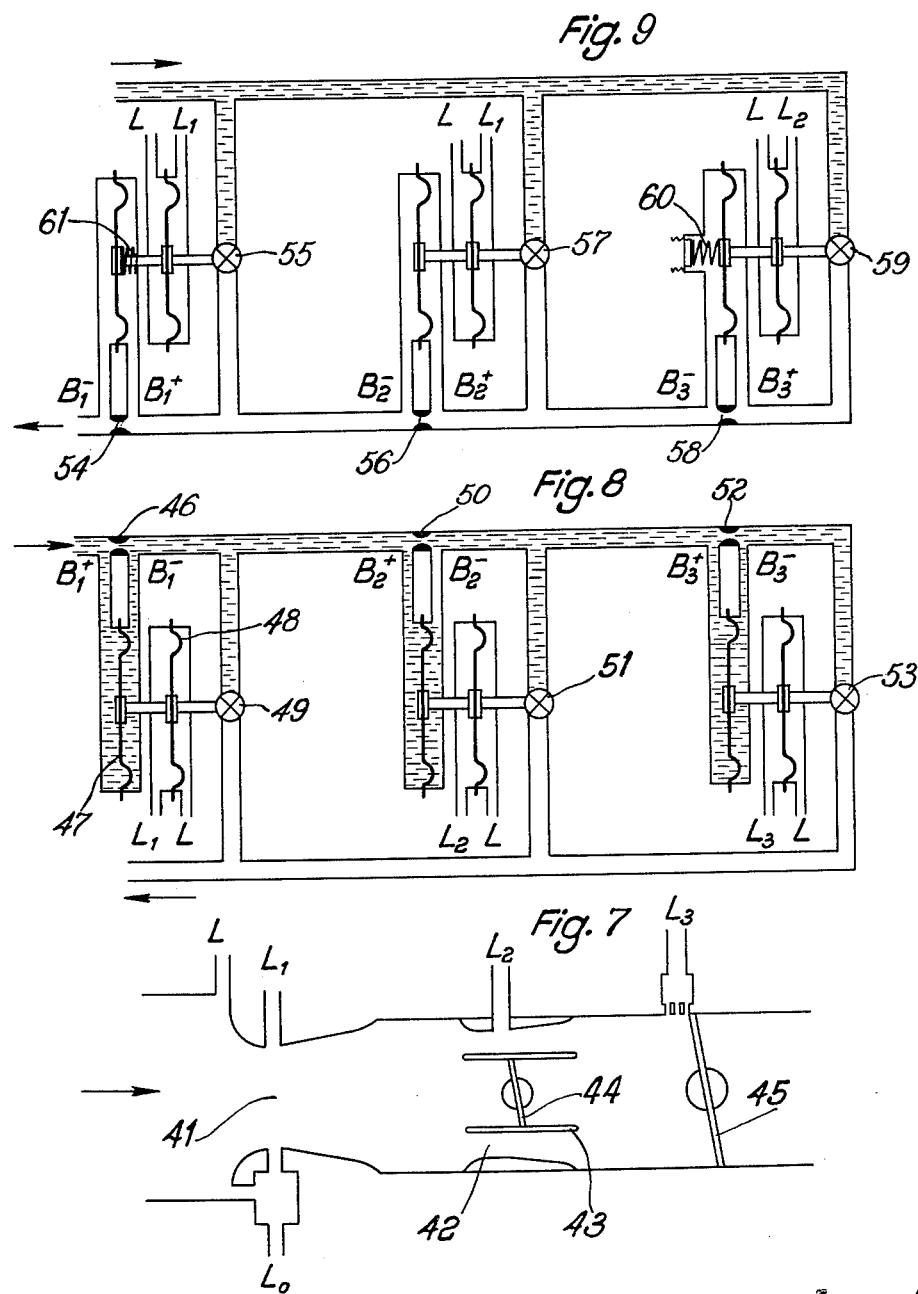

United States Patent Office 3,066,922
Patented Dec. 4, 1962

3,066,922
CARBURETORS
Heinrich Klaus Wucherer, Aurinstrasse 50, Neuss (Rhine), Germany
Filed Sept. 5, 1958, Ser. No. 759,182
Claims priority, application Germany Sept. 7, 1957
11 Claims. (Cl. 261—41)

This invention concerns multi-jet carburetor.

In the majority of present day carburetor and injection-type carburetor, several fuel jets are used in order to achieve a proper ratio of fuel to aspirated air over the entire operating range, this ratio being chosen to correspond to the most beneficial operating conditions. With the exception of the idling jets of butterfly-type carburetor and several slide valve or plunger-type carburetor which draw the fuel behind or downstream of the main fuel jet viewed in the direction of flow, additional or auxiliary jets are put into operation parallel to the main jets within the operating range of the carburetor, i.e. they draw the fuel required not behind another jet, but from the float chamber. The high performance jets, for example, are arranged in parallel in injection-type carburetor.

The invention relates particularly to carburetor and injection-type carburetor, wherein the mixture is formed in the operating range by the feature that fuel jets arranged in series are subjected to or controlled by pressures which originate in venturis in air throats which are also arranged in series i.e. subjected to the same air flow.

In a butterfly-type carburetor with a fuel outlet of a constant cross-section or aperture and a pressure-actuated or air-corrected main jet, the fuel supplied is determined by the air velocity in the venturi. With modern engines, particularly for use in mechanically propelled vehicles, it is becoming increasingly apparent that, when they receive the correct fuel mixture for full load at low speeds of revolution, they receive too little fuel for full load at high speeds of revolution and vice versa.

The invention will be described further, by way of example, with reference to the accompanying, generally diagrammatic drawings, in which:

FIGURES 7, 8 and 9 are schematic views showing the invention applied to injection type carburetors.

Figure 1:
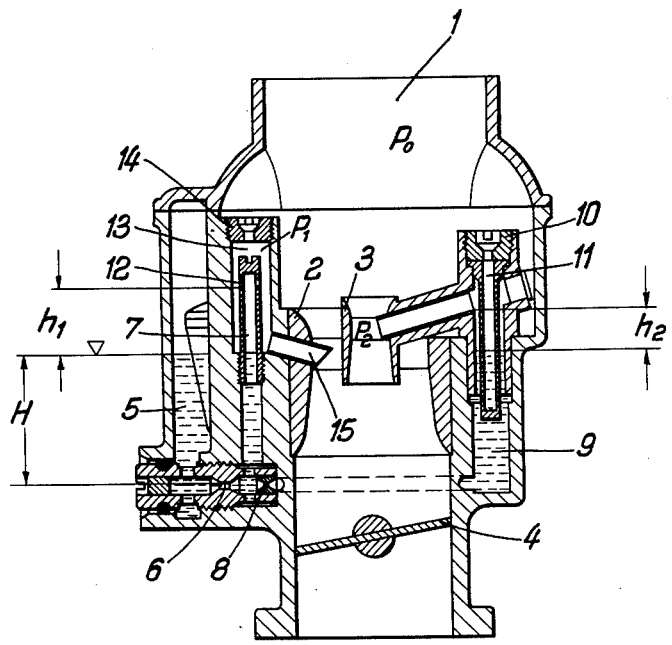
FIG. 1 is a sectional elevation of one arrangement for increasing the fuel/air ratio at full load and high speed.

In the carburetor shown in FIG. 1, from the air filter 1, a volume $Q_L$ of air at pressure $P_0$ flows per unit time through the venturi 2 and the diffuser or venturi 3, in which is developed a pressure $P_2$. The butterfly throttle valve 4 is actuated by the driver. The idling device is not shown in this figure. From the chamber 5, in which the fuel level is kept constant by the float the volume of fuel $Q_B$ flows per unit of time through the constriction or metering orifice 6 to the tube 7, and through the metering orifices 6 and 8 to the tube 9 which is provided with an air correction or compensation jet 10 and a mixing tube 11. The mixture flows out of the diffuser 3 at the pressure $P_2$. Fuel flows from the tube 7 through the bores 12 which are generally sufficiently large for the flow of fuel not to be impeded thereby, into the compartment 13 at the pressure $P_1$. With air entering through the jet 14, this fuel passes through a wide tube 15 into the venturi. The differential pressure $P_0-P_1$ is over the entire range of performance, an approximately constant fraction of the differential pressure $P_0-P_2$. The bores 12 determine the discharge height $h_1$ from the tube 7 above the level of fuel in chamber 5. The height of the fuel level in the tube 7 above the fuel level in chamber 5 may be denoted by $h_N$. As long as $h_N$ lies between $+h_1$ and $-H$ no fuel can flow from the tube 7 and no air can be drawn into the fuel supply line through the tube 7. If fuel of specific gravity $\gamma_B$ flows during the operation, a pressure drop $\Delta_I P$ will occur at the orifice 6 with the surface area $F_I$ and the flow number $\alpha_I$. Correspondingly a pressure drop $\Delta_{II} P$ occurs at the orifice 8. The total pressure drop on the two jets together will be denoted by $\Delta_{I-II} P$. Inside the flocculation jet of the tube 9, a further pressure drop $\Delta_3 P$ occurs, the relative value of which, compared with the pressure drop on the orifices, increases with rising performance and/or a rising differential pressure $P_0-P_2$.

In general, the equation $$Q = \alpha \cdot F \sqrt{\frac{2g \cdot \Delta P}{\gamma}} \qquad (1)$$

applies to the incompressible flow of gases and liquids through venturi tubes and orifices and for the resultant pressure differences $\Delta P$ and the volume of flow per unit time Q.

Since the flow of fuel through the orifices is normally obtained with a small Reynolds number flow number, $\alpha$, will decrease considerably with decreasing rate of flow and/or performance, differently and to a greater extent than the $\alpha$ of the air flow through the venturi.

For conciseness, let $$\frac{\alpha_I F_I}{\alpha_{II} F_{II}} = m \qquad (1a)$$

By means of Equation 1 there may be derived Equations 2a and 2b for the pressure drop on the individual orifices, from the pressure drop on the two orifices; thus, $$\Delta_I P = \frac{\Delta_{I-II} P}{1+m^2} \qquad (2a)$$

$$\Delta_{II} P = \Delta_{I-II} P \left[ \frac{m^2}{1+m^2} \right] \qquad (2b)$$

As long as no fuel is being delivered through tube 7 in the lower and medium operating range, a resultant surface area $F_{res}$, is also found which under the effect of the differential pressure $\Delta_{I-II} P$, gives the same delivery as the individual orifices; thus, $$\alpha \cdot F_{res} = \alpha_I F_I \left[ \frac{1}{\sqrt{1+m^2}} \right] = \alpha_{II} F_{II} \left[ \frac{m}{\sqrt{1+m^2}} \right] \qquad (3)$$

Experience shows that, for practical purposes, the "$\alpha$" values of Equation 3 can be made equal to one another. So long as the tube 7 is not delivering, the level of fuel $h_N$ is given by the equation $$h_N = \frac{P_0 - P_1 - \Delta_I P}{\gamma_B} \qquad (4)$$

$h_N$ is negative in the lower range since, due to the diminishing flow number $\alpha$, $A_I P$ diminishes at a lesser rate than $P_0-P_1$. Since, however, in the lower range the differential pressures, considered in absolute terms, become rather small, $h_N$ does not become so significantly negative that air can be drawn into the fuel line.

When the fuel level in tube 7 has reached the discharge bores 12, the volume of fuel discharged by the carburetor per unit time follows from the equation:

$$Q_B = \alpha_I F_I \cdot \sqrt{\frac{2g(P_0 - P_1)}{\gamma_B} - 2gh_1} \quad (5a)$$

From this we can deduce that the fuel/air ratio delivered by the carburetor will be in accordance with the equtaion:

$$\frac{Q_B}{Q_L} = \text{const} \times f(\alpha) \cdot \sqrt{1 - \frac{\gamma_B h_1}{P_0 - P_1}} \quad (5b)$$

$Q_B$ = Volume of fuel per unit of time
$Q_L$ = Volume of air per unit of time.

Figure 2:
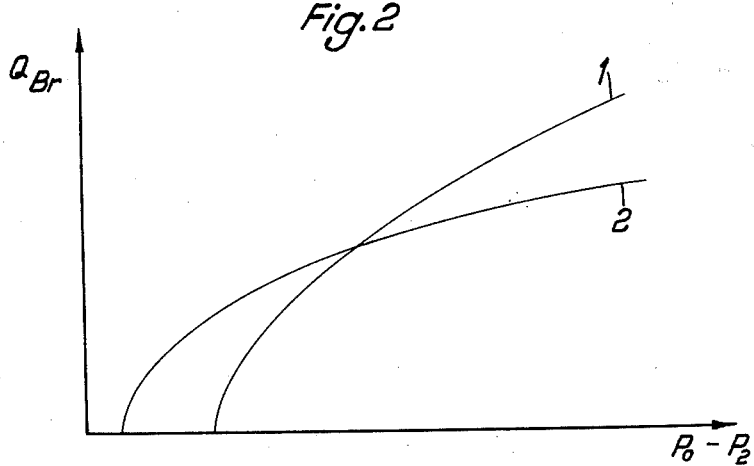
FIG. 2 is a graphical representation of the variation in the rate of fuel feed with a carburetor as shown in FIG. 1.

The root on the right hand side increases with the differential pressure, and approaches the value 1. The factor $f(\alpha)$ takes into consideration the flow numbers of the fuel and air and increases generally with the air flow. The intensity and mode of the enrichment is influenced by changing the orifice 6, the height of the bores 12, $h_1$, and $P_1$ and/or the jet 14. In FIG. 2 the quantity of fuel delivered is plotted against the differential pressure of the air flow. Curve 1 is obtained if the tube 9 is closed and only tube 7 is allowed to discharge through orifice 6. Curve 2 is obtained if tube 7 is closed and fuel is discharged through orifices 6 and 8 and tube 9. If the two tubes are re-opened, the delivery curve of the whole carburetor will coincide with the curve 2 as far as the point of intersection, and then will agree with curve 1.

In a practical construction the resultant curve rises already before the intersecting point of the curves 1 and 2 somewhat above these curves and follows above them, especially when flow resistances are present in tube 7 or when the discharged fuel reduces the differential pressure $P_0 - P_1$. This phenomenon does not interfere with the efficiency. A throttle effect in tube 7, e.g. through the bores 12 flattens the upper portion of the delivery curve. The latter effect may be utilised for compensation purposes by providing a selectable throttling arrangement in the tube 7.

The above-described arrangement has several advantages relative to known constructions. No limits are set to the amount of the enrichment. The continuity of the enrichment and the dependency on the air flow can be extensively influenced. The beginning of the enrichment may, if desired, be very gradual. When the tube 7 begins to discharge, there do not occur the delivery differences such as are caused e.g. by slight fluctuations of the fuel level when parallel jets are put into operation, since, in the case of the invention, a differential pressure already exists at the orifice 6 before the tube 7 begins to discharge. The variation of the delivery per unit of time of one jet which is caused, for example by a fluctuation of fuel level, is inversely proportional to the discharge of said jet.

Figure 3:
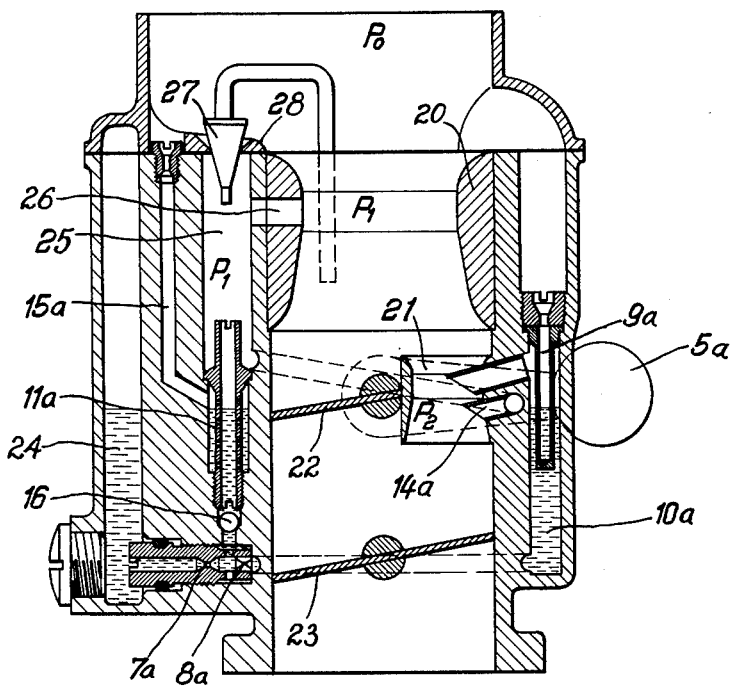
FIG. 3 is a sectional elevation of a multiple jet carburetor embodying the invention.
Figure 4:
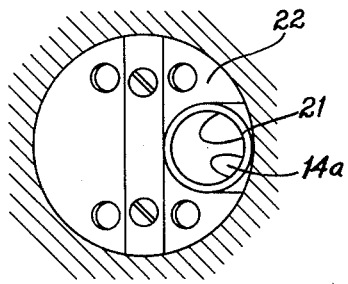
FIGURE 4 is a detail sectional view looking upwardly in FIGURE 3 and with the driver-actuated throttle valve removed.

An example of an application of this principle applied to compound or dual i.e. multiple-jet carburetors is shown in FIG. 3. From the filter chamber air flows through a wide venturi 20 through a narrower venturi or diffuser 21 and through or round the butterfly valve 22 onwards to the butterfly throttle valve 23 which is actuated by the driver. The butterfly valve 22 begins to open against the counter-weight indicated at 5a if a given vacuum prevails behind it. In this case, the torque of the pressure is, for instance, effected by the asymmetrical distribution of the apertures or bleeds in the butterfly valve 22. It is an advantage of the principle of successively arranged fuel jets and venturis that the butterfly can be opened in the manner herein described, for in the case of conventional multiple-jet carburetors or compound carburetors an additional butterfly valve is used in the second venturi which, dependent upon the butterfly valve actuated by the driver, begins to open when said first-mentioned butterfly has opened to a predetermined extent.

The fuel flows from chamber 24 which is kept at a constant level by the float, through the orifices 7a and 8a, to the foam air or flocculation jet 9a of the tube 10a, from which it enters the diffuser 21 at a pressure $P_2$. A constriction of the cross-sectional area of the passage to one-third of the area of the venturi 20 is here effected for example by the butterfly 22. So long as the butterfly valve 22 has not commenced to open, this carburetor works like any known similar carburetor with a similar smaller diameter and an orifice having a surface area $F_{res}$. The shape of the passages and the bores in the butterfly valve 22 can also be used in the lower operating range to regulate the mixture control. If many small bores with rounded edges are provided, together with a small diffuser opening, a flow number is obtained, the characteristic of which becomes more nearly similar to that of the fuel flow through the jets, i.e. which decreases with decreasing speed. Instead of this, an annular space may alternatively be allowed to remain open between the butterfly valve 22 and the casing, or any other crescent-shaped area can be opened (by only partly closing the butterfly valve in the lower operating range).

At higher performance, at the latest by the time the butterfly valve 22 has opened, the delivery is determined by the tube 11a which draws its fuel from behind orifice 7a. The chamber 25 will be subjected to the pressure $P_1$ via the wide opening 26. This pressure determines the discharge of the tube 11a. The upper edge of the tube 11a represents the discharge height $h_1$ above (or below) the fuel level. The overflowing fuel and air is drawn to the diffuser through the narrow passage 14a without the pressure prevailing therein appreciably influencing the pressure $P_I$ in the chamber 25. The height of the upper edge of the tube 11a can also be used to govern the composition of the mixture. It may even be at the same height as the level of the float or be somewhat below it without residual fuel draining off in the stationary condition if only the discharge end of the tube 14a is positioned above the fuel level. Compensation air is fed through the channel 15a to the tube 11a. Experience shows that this compensation air increases the delivery of the tube 11a at the commencement of the discharge. The pressure which otherwise normally prevails above the fuel column above the air compensation bore is eliminated.

As stated already in connection with FIG. 1, the fuel level in the tube 11a decreases in the partial load range, without however, permitting air to be drawn into the tube 10a. As a precaution, a ball check valve 16 may be arranged in the tube 11a to constitute a non-return valve. The delivery of the tube 11a can also be influenced by changing the pressure $P_1$ of the chamber 25, for example by opening a variable aperture to the filter chamber with the pressure $P_0$, dependent on the position of the butterfly valves 22 or 23, or by reducing the area of the opening 26. In FIG. 3, the chamber 25, for example, is closed by a shutter 28, the aperture of which is filled by an axially displaceable cone or contoured member 27. This displacement is dependent on the position of one of the butterfly valves i.e. the delivery can be influenced as a function of the butterfly valve position or the air flow.

A starting device may be included as follows:

The bores in butterfly valve 22 are omitted and the aperture for the small diffuser is kept as small as possible. In normal operation butterfly 22 can only be closed to a predetermined position, where a stop is provided so that air flows round it. For starting purposes, butterfly valve 22 is completely closed, i.e. the stop is removed and simultaneously the chamber 25 is completely closed relative to the venturi 20 and the filter chamber, so that the pressure $P_2$ also acts on the tube 11a. This greatly increases the fuel delivery during starting. If a strong differential pressure is suddenly created after the engine has been started, the butterfly valve opens a little in order consequently to reduce excessive enrichment of the mixture. It must be pointed out once again that the carburetor herein described has, apart from the other advantages apparent from the description, and in comparison to conventional constructions, the further advantage that the discharge of fuel or of mixture always takes place into a high air velocity or a rather high partial vacuum, a feature which results in the formation of an improved mixture.

Butterfly valve 22 instead of being actuated as shown herein, may alternatively be mechanically operated by the driver, similarly to the butterfly valve 23, so that the butterfly 22 begins to open when the butterfly 23 has reached a certain opening angle.

Figure 5:
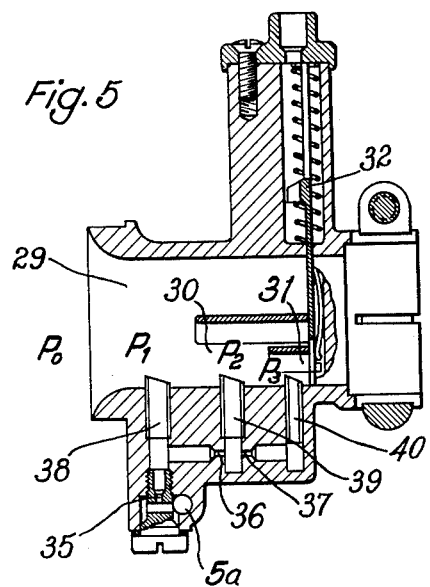
FIG. 5 is a sectional elevation of a horizontal slide valve carburetor having several jets.
Figure 6:
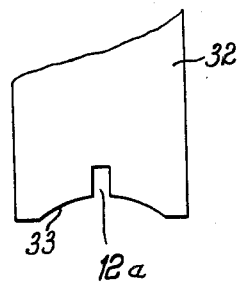
FIGURE 6 is a detail view of the slide valve per se, partly broken away.

FIG. 5 shows a horizontal or flat flow slide valve carburetor having three constant venturis. The air flowing in through the venturi 29 at pressure $P_1$ flows on to the venturis 30 and 31 formed by simple partitions, at pressures $P_2$ and $P_3$. In this embodiment, the slide valve 32, which may be of a plastic material if desired, is opened by the driver against spring pressure, and first opens the venturi 31 and then a further area of venturi 30 and of venturi 29. The rounded lower edge 33 of the slide valve 32 corresponds to the curvature of the counterpart of the partitions for the venturis 30 and 31. The composition of the mixture at part load and in the operating range of the venturi 31 as well as of the tube 40 can be influenced by providing the slide valve with a notch 12a or bores (not shown) or both, which makes it possible for a part of the inflowing air which is already in the operating range of the venturi 31 to flow round the venturi 31, e.g., from an aperture in the slide valve to be selected.

The fuel coming through the opening 5a from the float chamber flows to the orifices 35, 36 and 37, each supplying a respective tube 38, 39 and 40. While, in the partial load range, the level in the tube 38 drops and the tube 40, and the tube 39 determine the fuel delivery, the delivery in or approaching the full load range is determined by the tube 38. Compensation or correction air may also be supplied to the tubes 38, 39 and 40. The pressure $P_1$ and $P_2$ of the venturis 29 and 30 can only be applied to the tubes 38 and 39 to aid the fuel delivery, while the fuel/air mixture is fed by pipes to the venturi 31 (compare FIG. 3). The connections of the tubes 38 and 39 to their venturis can also be closed to obtain an enrichment for example, for starting.

The use of the principle of successively arranged or series-connected jets, which are controlled by pressures which form in series-arranged venturis and through which the same air flows, will now be described with reference to injection-type carburetors.

The term "injection-type" carburetor will be used herein (regardless of whether the fuel is actually injected under pressure by means of a pump) to denote any carburetor in which the metering is so effected that, by means of pressure differentials which are balanced on diaphragms or diaphragms and overflow plungers, valves are actuated and the fuel discharge is metered.

The application of injection-type carburetors to engines for mechanically propelled vehicles, inter alia, presents a problem because, on account of the relationship of the pressure acting on the diaphragm, to the square of the rate of flow per unit of time ($P-P_0$=constant $Q^2$) at high performance pressures or forces arise which are more than a thousand times the pressures or forces which prevail during idling. The possibility, for instance, of using two injection-type carburetors, one of which is put into operation only when a given air flow has been achieved, proves to be disadvantageous, since when the second carburetor is put into operation, spraying or other variations occurs. Equation 8 shows the relation between a faulty pressure measurement by $\Delta_p$ at one diaphragm (e.g. due to faulty fuel level, wrong spring tensioning or air in fuel supply lines) and the resultant error in the flow volume measurement:

$$\Delta Q_B = \frac{\text{const}}{Q_B} \times \Delta P = \frac{\text{konst}}{\sqrt{P_0-P}} \times \Delta P \qquad (8)$$

$$\frac{\Delta Q_B}{Q_B} = \frac{\text{const}}{Q_B^2} \times \Delta P = \frac{\text{konst}}{P_0-P} \times \Delta P \qquad (9)$$

It will be seen particularly that the relative error of the volume measurement, which is a measure of the error of the mixture ratios, sharply rises with a diminishing flow volume per unit of time. Even if an attempt is made to regulate the entire operating range of an engine by means of a regulating device consisting of a venturi, a fuel jet, and a diaphragm control incorporating a valve, it will be seen that, according to Equations 8 and 9, intense spraying or variations may be expected in the lower operating range and during idling. When a control element is used, any tendency towards a lean mixture (which may occur at low performance owing to the comparatively large reduction in the flow number of the fuel flow relative to that of the air flow) is countered by augmenting the air force on the diaphragm by a constant spring force. If the mixture was correct for low performance, it was too rich for idling, and for this purpose only during idling, a further jet was connected purely mechanically, downstream of the main jet in the path of the fuel.

It has also been proposed to use a diaphragm attachment which, in the operating range, achieves control by means of the venturi pressure and a main jet. For a low air intake and idling condition, a second jet behind the main jet had to be brought into operation by sudden switching into the fuel supply system and additionally a part at lower pressure had to be transferred to the air side of the diaphragm. The latter procedure necessitates a sudden change-over and thus gives a bad transition.

The principle of the present invention as applied to injection-type carburetors is described with reference to FIGS. 7, 8 and 9. FIG. 7 shows an air circuit for injection-type carburetors. From the filter chamber, at pressure L air flows through the venturi 41 where the pressure $L_1$ is developed, and the flow continues through the venturi or diffuser 42 at pressure $L_2$. In the part load range, the free area of the diffuser is reduced, as far as the requirements of practice show it to be advisable, by providing two parallel shields 43 or a cylindrical sleeve in the flow, the gap between which is closed by a butterfly valve 44. The butterfly valve 44 can, for example with the aid of a diaphragm control means, begin to open at a selected rate of air flow. It may open automatically against a weight or a spring if its centre of gravity is located near the axis. The butterfly 44 may however, alternatively, be connected to the butterfly valve 45 in such a way that it begins to open when the latter has reached a certain degree of opening. A certain distribution of pressure on the butterfly valve is obtained by means of a by-pass bore, and the pressures are transferred as $L_3$. $L_0$ has a selected fraction of the reduced pressure at the venturi 41.

FIG. 8 shows the fuel side of an injection-type carburetor having respectively three orifices, three pressure measuring means and three valves. The fuel is delivered by the pump at the pressure $B_1^+$ and beyond orifice 46 is at the pressure $B_1^-$. The pressure difference tends to urge the diaphragm 47 to the right (fuel force). The diaphragm 48 is forced to the left by the pressure difference between the filter chamber and the venturi 46. The valve 49 adjusts itself as a result of the displacement of the rod connecting the diaphragms, in such a way that the force of the air and the force of the fuel are balanced.

Whereas, at high performance, the first control element with the orifice 46 alone takes over the metering of the fuel, the second control element with the orifice 50 becomes effective at low air flow, when the butterfly valve 44 is closed, since the flow number of the fuel flow through orifice 46 decreases more rapidly than the flow number of the air current through the venturi 41. In the second control element the force of the air is much greater owing to the much smaller area of the diffuser, so that a more accurate metering is possible. The fuel flow passing through orifice 50 and the associated valve must first pass through orifice 46 and ensures that the first control element remains closed when the discharge of the second control element is higher than that which would result from a fuel flow via the valve 49.

It may be that if the diffuser 42 has too large a cross-section, the discharge through the valve 51 during idling is too variable and too small. The valve 51 may then be by-passed by way of the third control element with orifice 52. The third control element then takes over the metering for idling and very low performance. When the butterfly is increasingly opened, the valve 53 will very soon let through too little fuel, since the force of the air associated with $L_3$ then soon decreases again. The fuel delivery is then determined in each case by that control element which gives the maximum value in the appropriate operating conditions. As shown in FIG. 2, a fuel delivery thus results which is composed of the highest parts of the discharge curves of the individual control elements.

FIG. 9 differs from FIG. 8 especially in that the throttle valve associated with one jet is located in front of the jet in the fuel flow, e.g. orifice 54 and the associated valve 55. In the part load range the fuel must therefore flow through the orifices accordingly in the sequence 58, 56, 54. The arrangement of FIG. 9 can be used for simplifying the distribution of the fuel to the individual cylinders e.g. by providing one group of parallel orifices each instead of the individual orifices 54 and 56.

Furthermore, the use of $L_3$ is omitted in FIG. 9. In this case, idling must also be controlled jointly by the venturi 42 or $L_2$. The adjustability of the composition of the mixture for idling may also be achieved by the adjustable spring 60 which assists the force of the air corresponding to $L_2$ and is effective particularly during idling. The centre control element with orifice 56 and the valve 57 in this case takes over the normal operating range.

The control element associated with orifice 54 is intended to take over the gradual enrichment at full load and at high speeds of revolution. For this purpose, the orifice 54 must be made larger than orifice 56 and, so that enrichment does not take place over the entire performance range, the force of the fuel must be aided by a constant spring tension (spring 61). What has been stated concerning enrichment in the case of the carburetors shown in FIGS. 1 and 2, also applies to enrichment in the case of injection-type carburetors. Equation 5b also applies to the character of the enrichment only if $\gamma_B \cdot h_1$ is replaced by the force of the spring 61 per unit area of the diaphragm. The described enrichment can be decreased to the desired extent for maximum performance by providing a throttling means in the path of the additional fuel which only flows via the valve which is effective during the enrichment. When, in order to influence the fuel discharge curve, for instance, the force of the air in the control element associated with orifice 56 is assisted by a spring, it may be necessary at low performance to close the associated valve 57, or a small butterfly valve aperture, by some means which is located independently of said control element. Then, for example, the force of the fuel must be mechanically assisted or controlled by a special diaphragm.

As in the case of conventional injection-type carburetors, the delivery or discharge curve can be influenced by falsifying the operative pressure on the air diaphragm, i.e. by rendering possible a partial balance in the corresponding control element between the air pressures, as by arranging a variable section in a connecting pipe. This change of cross-section may be controlled by the position of the butterfly valve, by the air flow or by the air density. In practice, it is often preferable to take up all the higher fuel pressures $B^+$ in FIG. 8 at the point $B_1^+$ or the lower fuel pressures $B_1^-$ in FIG. 9 all at the point $B^-$. For the second and third control elements, the areas of the orifices 50 and 52, or 56 and 58, as the case may be, are then no longer directly decisive, but become subordinate to the areas resulting from Equation 3.

The butterfly valve 44 which opens, for example, dependently on the pressure $L_2$ and is shown in FIG. 7, can be prevented from completely closing during normal operation by means of a stop. In order to enrich the mixture when starting, this stop can be removed at constant air flow, much higher vacua and fuel discharges can be obtained only if the area of the diffuser 42 is small enough. After the engine starts, the vacuum in the inlet manifold and in the diffuser 42 suddenly rises and the butterfly valve 44 begins to open, thus weakening the mixture again. This effect is intensified if, when the stop for the butterfly 44 is removed, the pressure of the diffuser is switched to the control element of the venturi 41, or if the orifice controlled by $L_2$ is supplemented for starting by an additional parallel orifice.

The individual control elements need not be of the arrangement shown in FIGURES 8 and 9. Almost any of the known control elements may be used. It is possible to execute the control element effective at low performance (FIGURE 9) in such a way that it acts at the same time also as back-flow valve to the fuel pump.

I claim:

1. In a carburetor, a fuel chamber, an air passage including a venturi, a fuel flow line from said chamber including first and second metering orifices, in series, first conduit means supplying fuel flowing through said first orifice only to said venturi, and second conduit means supplying fuel flowing through both said orifices in sequence to said venturi.

2. A carburetor comprising, a fuel chamber wherein fuel is maintained at constant level, an air passage including a venturi, a fuel flow line from said chamber including first and second metering orifices in sequence, said first orifice having a greater capacity than said second orifice, first conduit means connected with said flow line between said orifices to supply fuel to said venturi, and second conduit means connected with said flow line and supplying fuel flowing through both said orifices, in sequence, to said venturi.

3. In a carburetor, a fuel chamber wherein fuel is maintained at constant level, a fuel flow line from said chamber and including first and second constrictions in sequence, means forming an air flow passage including first and second venturis, said first venturi being arranged about said second venturi, first conduit means supplying fuel from said flow line to said first venturi from a point between said constrictions, and second conduit means supplying fuel from said flow line to said second venturi from a point downstream of both said constrictions.

4. A carburetor as recited in claim 3, said first conduit means including a vertically-disposed tube having a fuel discharge bore at a level above the level of fuel in said chamber, fuel flowing through said first constriction rising to the level of said bore, for flow therethrough, only in response to a predetermined low value of absolute pressure in said first venturi.

5. In a carburetor, a fuel chamber in which fuel is maintained at constant level, a fuel flow line from said chamber including first and second orifices, in sequence, an air flow passage including venturi means, first conduit means supplying fuel to said venturi means through said first orifice only, and second conduit means supplying fuel to said venturi means from a point downstream of both said orifices, said first conduit means including a vertically disposed tube having a fuel flow opening above the level of fuel in said chamber.

6. A carburetor comprising, a fuel chamber in which fuel is maintained at constant level, a first air-flow venturi, a second air-flow venturi positioned within said first venturi, a fuel flow line from said chamber and including first and second metering orifices, in sequence, said first metering orifice having a greater flow capacity than said second metering orifice, first conduit means connected with said fuel flow line between said orifices and including a tube having a fuel outlet a predetermined vertical distance above the normal level of fuel in said chamber, means conducting fuel flowing from said tube to said first venturi, said second conduit means supplying fuel to said second venturi from a point in said flow-line downstream of both said orifices, and means maintaining substantially constant the ratio $$\frac{P_0 - P_1}{P_0 - P_2}$$

where $P_0$ is the pressure of the air in advance of said venturis, $P_1$ is the pressure effective on said tube and $P_2$ is the pressure within said second venturi.

7. A carburetor comprising, a float chamber wherein the fuel is maintained at a predetermined level, a fuel flow line from said chamber including first and second metering orifices, in sequence, said first orifice being of larger capacity than said second orifice, air flow venturi means, first and second fuel supply nozzles in said venturi means, a first conduit connecting said first nozzle and said flow line between said orifices, a second conduit connecting said second nozzle and said flow line downstream of both said orifices, said first conduit including a compartment, a vertical tube in said compartment, and having a fuel outlet at a level above the level of fuel in said chamber, said first nozzle being connected with said compartment substantially at said level, and means maintaining the pressure in said compartment between the pressures in said air flow means in advance of said venturi means and in said venturi means.

8. A carburetor as in claim 7, said venturi means including a first venturi into which said first conduit discharges fuel and a second venturi within said first venturi and into which said second conduit discharges fuel.

9. A carburetor as in claim 7, said venturi means including a main venturi and a diffuser venturi downstream of said main venturi, said first and second nozzles discharging fuel into said diffuser venturi, and a counterweighted butterfly valve restricting air flow exteriorly of and about said diffuser venturi and opening only in response to a predetermined velocity of air flow through said diffuser venturi, and a passageway connecting said compartment with the throat of said main venturi.

10. In a carburetor having a fuel chamber wherein fuel is maintained at constant level, a fuel flow line from said chamber and including first, second and third constrictions, in sequence, an air passage including a first main venturi, and second and third venturis independently mounted within said main venturi, a first conduit supplying fuel from said line to said main venturi through said first constriction only, a second conduit supplying fuel to said second venturi from fuel flowing in sequence through said first and second constrictions only, a third conduit supplying fuel from said flow line to said third venturi from fuel flowing in sequence through said first, second and third constrictions only, and a manually actuable slide valve mounted for movement in and across said air passage on the downstream side of all said venturis, from a first position obstructing flow through all said venturis, to positions successively and sequentially opening said third, second and first venturis, in the order mentioned.

11. A carburetor as in claim 10, said first venturi having a longitudinal first axis of symmetry, said second and third venturis comprising plates arcuately curved about respective second and third axes parallel with and offset from said first axis, said first, second and third conduits being arranged in respective coplanar lines normal to said axes, said second venturi terminating between the outlets of said first and second conduits, said third venturi terminating between the outlets of said second and third conduits, said valve comprising a plate having a metering edge conforming to the curvature of the plates forming said second and third venturis, and mounted across said air passage for translation into successive ones of said positions.

References Cited in the file of this patent
UNITED STATES PATENTS

| | | |
|---|---|---|
| 1,257,195 | Lukacsevics | Feb. 19, 1918 |
| 1,260,273 | McCaleb | Mar. 19, 1918 |
| 1,652,859 | Heftler | Dec. 3, 1927 |
| 1,771,530 | Edwards | July 29, 1930 |
| 2,063,433 | Grenat | Dec. 8, 1936 |
| 2,208,317 | Beck | July 16, 1940 |
| 2,495,299 | Tarter | Jan. 24, 1950 |
| 2,615,696 | Winkler | Oct. 28, 1952 |
| 2,621,911 | Lindsteadt | Dec. 16, 1952 |
| 2,676,004 | Bimberg | Apr. 20, 1954 |
| 2,759,717 | Nollinger | Aug. 21, 1956 |